United States Patent [19]
Guillaud

[11] 3,734,665
[45] May 22, 1973

[54] ROTARY MOLDING MACHINE

[75] Inventor: Michel Pierre Cyrille Guillaud, Grenoble, France

[73] Assignee: Societe d'Etudes et de Construction de Materiel Electrique et Radioelectrique S.E.C.M.E.R. Chemin du Sablon, La Tronche (Isere), France

[22] Filed: Mar. 9, 1971

[21] Appl. No.: 122,328

[52] U.S. Cl. .................425/174, 264/26, 425/429, 425/DIG. 13
[51] Int. Cl. .................B29c 5/04
[58] Field of Search.............18/26 RR, DIG. 13; 264/166, 26; 425/3, 174, 429, DIG. 13

[56] References Cited
UNITED STATES PATENTS

| | | | |
|---|---|---|---|
| 2,967,329 | 1/1961 | Friedland et al. | 18/26 RR |
| 2,583,329 | 1/1952 | Eckert | 264/26 X |
| 2,604,665 | 7/1952 | Bosomworth et al. | 264/26 |
| 2,811,747 | 11/1957 | Belz | 18/26 RR |
| 2,984,887 | 5/1961 | Thiess | 18/DIG. 13 |

Primary Examiner—Robert L. Spicer, Jr.
Attorney—Waters, Roditi, Schwartz & Nissen

[57] ABSTRACT

This rotary molding machine designed mainly for the rotary molding of synthetic materials is also adapted to mix in a heated vessel a plurality of liquid, solid or pulverulent substances for carrying out certain heat treatments or chemical treatment by heat action, and comprises a frame structure adapted to be rotatably driven about a first transverse axis and provided with means for rotatably driving a mold about its axis, or a detachable vessel containing the material to be molded about a second axis coplanar and perpendicular to said first axis, said mold or vessel consisting of a relatively thin material adapted to be induction heated, the heating means proper consisting of an induction coil connected to a low-frequency a.c. source and secured to said frame structure, said coil consisting of connectors wound to form contiguous turns about an axis orthogonal to said first and second axes of rotation of said mold, so as to constitute a kind of sheath having a configuration homothetic to the mold configuration and bounded by two planes parallel to the plane in which the mold axes are located, whereby the mold, by approaching very closely the inner face of said coil, can easily be engaged therein or removed therefrom, and nevertheless be heated very rapidly and throughout its wall to a homogeneous temperature for melting the material contained therein or keeping said material at a predetermined temperature.

6 Claims, 5 Drawing Figures

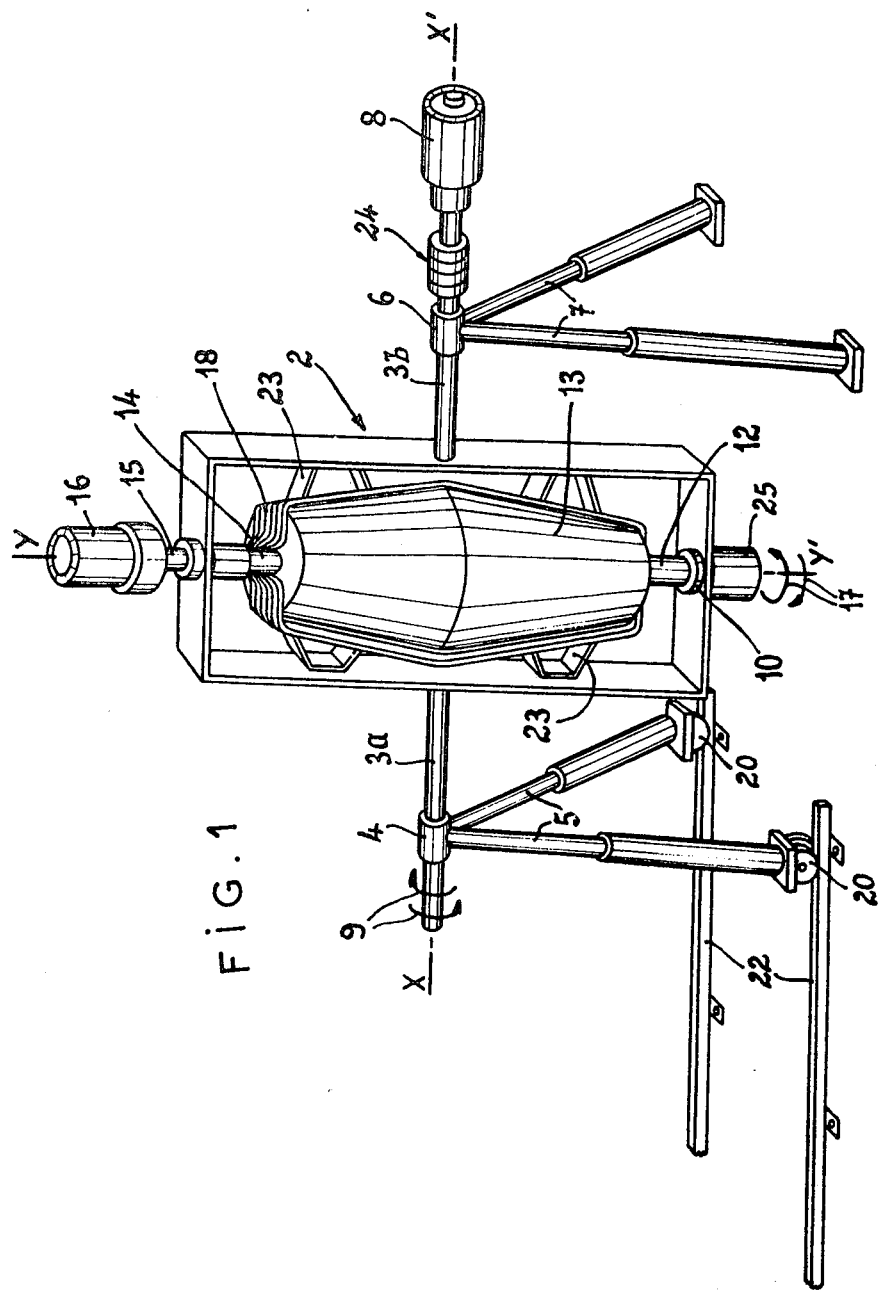

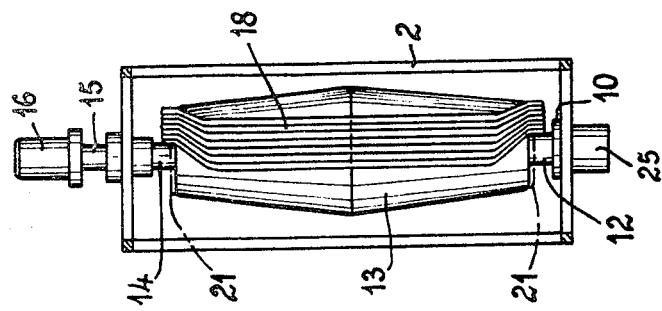
FIG. 3
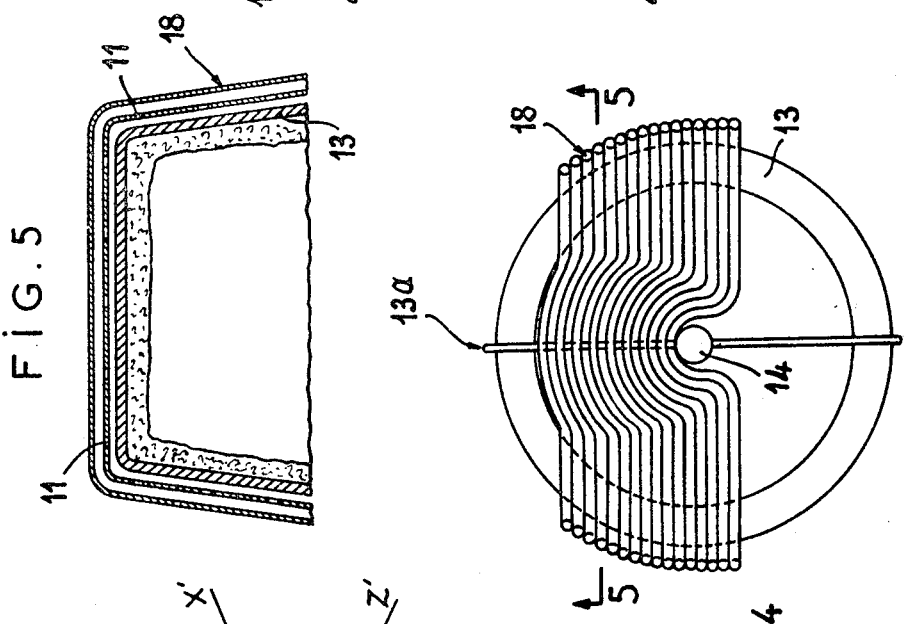
FIG. 5
FIG. 4
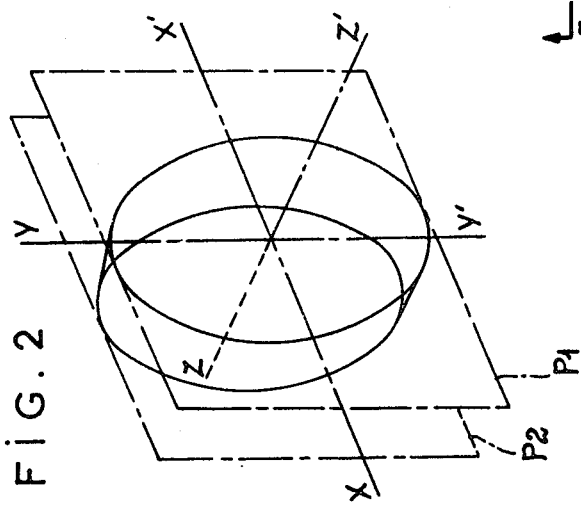
FIG. 2

ROTARY MOLDING MACHINE

FIELD OF THE INVENTION

The present invention relates in general to rotary molding machines and has specific but not exclusive reference to a machine of this character for molding synthetic materials.

DESCRIPTION OF THE PRIOR ART

In addition to conventional manufacturing methods such as the injection molding and blow molding processes, the rotary molding process has been developed these last few years. This rotary molding process consists in enclosing the molding material in a fluid-tight mold or vessel adapted to pivot about two perpendicular axes and provided with means for heating the material to its melting point or maintaining this material at a predetermined temperature, and means for rotating said mold or vessel about said axes.

This method is particularly advantageous for producing small quantities of pieces or articles or all shapes, and also for producing parts of relatively great size such as tanks having a capacity of several thousand liters, for the cost of the mold necessary for their manufacture is considerably lower than that of the molds required for any other process.

However, the practical applications of this interesting method are restricted by technological limits imposed to the heating means utilized therewith. Outside the use of hot air or infrared radiation (not capable of producing a uniform heating throughout the mold wall) a current proposition consists in utilizing hot oil. A serious drawback of this method is that the mold must compulsorily be of double-wall construction, so that its cost increases considerably and puts the user under the economical domination of the manufacturer of the machine for making the molds.

Moreover, before stripping the molded piece from these oil-heated machines the operators must disconnect the hydraulic circuit leading to the mold, so that detrimentally long hold up times elapse between the end of one molding operation and the beginning of the next molding operation.

Moreover, a reasonably economical mold operation cannot be achieved unless the melting point of the material contained in the mold is attained in a relatively short time, and the moulded piece must also be cooled at a relatively fast rate to permit the stripping thereof. Now to meet these requirements, extremely sophisticated and expensive hydraulic installations are necessary in order to achieve a rapid heating and cooling of huge amounts of oil. Furthermore, the oil utilized therein must have specific properties and notably be capable of being heated very rapidly while remaining fluid at room temperature; now mineral oils as now commercially available cannot withstand a temperature in excess of 290°C, which is satisfactory for molding articles of relatively moderate wall thickness, but definitely not sufficient for making large and/or thick pieces.

Obviously, these various inconveniences inherent to the heating method limit considerably the field of application of this process which, on the other hand, is extremely attractive.

SUMMARY OF THE INVENTION

It is the essential object of the present invention to provide a rotary molding machine which is completely free of these various inconveniences.

To this end, the present invention provides a rotary molding machine of the type comprising a frame structure adapted to be rotatably driven about a first transverse axis and carrying means adapted rotatably to drive the mold proper or like detachable vessel, containing the material to be molded, about a second axis perpendicular to and coplanar with said first axis, this machine being characterized in that the mold or vessel consists of relatively thin material, adapted to be heated by induction, the heating means proper comprising an induction coil connected to a source of low-frequency alternating current, said coil being secured to the aforesaid frame structure and consisting of conductors wound to form contiguous turns about a plane orthogonal to the above-defined axes of rotation of the mold, so as to constitute a kind of sheath having a shape homothetic to that of said mold and bounded by two planes parallel to the plane containing said axis of rotation of said mold, whereby the mold positioned very close to, but not in engagement with, the inner surface of said coil, can easily be engaged into or removed from said coil, and be heated very rapidly and throughout its wall at a homogeneous, uniform temperature for melting the material contained therein.

With this arrangement, the material to be molded is heated very rapidly and uniformly, notably as a consequence of the mold rotation with respect to the induction coil.

Moreover, the mold construction is extremely simplified in comparison with hitherto known double-walled molds, so that its cost is reduced accordingly and its manufacture is also simplified so that the user himself can make the necessary molds without resorting to another constructor. Moreover, the mold is adapted to be mounted to or removed from the frame structure very easily, i.e. without any time-robbing and tedious handlings, so that the efficiency of the molding operation is improved considerably.

Preferably, when the mold carries a pair of opposite coaxial trunions adapted the one to be coupled to means for rotatably driving the mold and the other to engage a bearing, all the induction coil conductors are disposed on the same side of these trunnions.

This arrangement is advantageous in that all the conductors are assembled at the shaft level and thus provide a more efficient heating whereby the heat losses due to the thermal conductibility of these trunnions are compensated.

The mold may be cooled by spraying air and a suitable liquid thereagainst. To this end, the air and liquid are distributed by means of the heating coil consisting of hollow copper tubing.

Orifices of adequate size are formed along the coil, on the mold-facing side thereof.

With this arrangement a very efficient distribution of the cooling fluid is achieved and the heating system can serve both purposes, i.e., heating and cooling. Upon completion of the cooling cycle and before the heating cycle for treating another batch or molding another piece or article, the coil may advantageously be energized with a very low voltage in order to eliminate any trace of liquid likely to be left therein.

Of course, various arrangements may be contemplated for increasing the thermal magnetic and general efficiency of the apparatus.

BRIEF DESCRIPTION OF THE DRAWINGS

A typical form of embodiment of the machine according to the present invention will now be described in detail by way of example with reference to the attached drawings, in which:

FIG. 1 is a diagrammatic perspective view of the rotary molding machine according to this invention;

FIG. 2 is a perspective diagram showing for explanatory purpose the general disposal of the induction coil;

FIG. 3 is a side elevational and part-sectional view of the coil and mold assembly illustrated in FIG. 1;

FIG. 4 is a plan view from above showing on a larger scale the position of the conductors at the level of the mold trunnions, and FIG. 5 is a fragmentary section taken along the line 5—5 of FIG. 4, showing a modified form of embodiment of the machine.

DESCRIPTION OF THE PREFERRED EMBODIMENT

The machine according to this invention comprises in a manner already known per se a frame structure 2 rigidly connected to and supported by a pair of horizontal opposed trunnions 3a, 3b aligned on a common shaft X–X'. As shown more particularly in FIG. 1, one trunnion 3a is carried by bearing 4 supported in turn by a pair of oblique struts, or legs 5, the other trunnion 3b being carried by a bearing 6 supported by another pair of oblique struts or legs 7. Moreover, the trunnion 3b extends beyond bearing 6 and is drivingly connected to an electric motor 8 adapted to rotate this trunnion in either direction, as illustrated by the arrows 9.

The frame structure 2 is provided at one end with a bearing 10 of the quickly detachable type, adapted to receive therein a trunnion 12 rigid with one end of a mold or like vessel 13 carrying at its opposite end another, aligned trunnion 14. The latter is provided at its free end with quick-release coupling means whereby it can be detachably connected to the output shaft 15 of another electric motor 16 having its casing secured to said frame structure 2. This electric motor 16 is adapted to impart to the mold or like vessel 13 a movement of rotation in either direction, as illustrated by the arrows 17, about the axis Y–Y' perpendicular to the aforesaid axis X–X'.

According to this invention, the material contained in the mold 13 is heated by means of an induction coil 18 secured to the frame structure 2 and having its inner surface disposed very close to but nevertheless spaced from one portion of the mold wall, i.e., without contacting same. This induction coil 18 consists of electric conductors wound to provide contiguous turns about an axis Z–Z' orthogonal to the aforesaid axes X–X' and Y–Y', as illustrated in FIG. 2. These conductors are wound to constitute a kind of sheath having a shape homothetic to that of said mold 13, but this sheath is bounded by two planes P1 and P2 parallel to each other and to the plane containing the axes X–X' and Y–Y'. Moreover, the sheath is so disposed in the frame structure 2 that its diametral plane P1 is merged into that containing said axes X–X' and extends slightly beyond this plane.

As shown more in detail in FIGS. 3 and 4 this arrangement of the induction coil 18 permits of fitting and removing very easily the mold 13 into or from the frame structure 2 and therefore to spare time by minimizing handlings and increasing the efficiency of the machine in comparison with conventional rotary molding machines.

The induction coil is connected to a source of low-frequency voltage, notably an alternator adapted, when the supply circuit is closed, to deliver an a.c. voltage of the order of 150 Hz to said coil. Although the coil is not closed completely, the mold 13 and the material contained therein are heated very homogenously, due to the rotation of this mold within the coil.

Preferably, the mold 13 is made from a material adapted to be heated by the action of a low-frequency induced current, notably mild steel. Of course, the thickness of the mold wall depends on the frequency of the current flowing through the coil and may vary from 3 to 10 mm, although a thickness of the order of 5 mm is preferred for most applications.

As shown more particularly in FIG. 4, and as already known in the art, the mold 13 comprises two sections assembled along a joint plane 13a which, in this specific form of embodiment, lies on the axis X–X', but it will readily occur to those conversant with the art that a different disposal may be resorted to without departing from the basic principle of the invention.

In this modified form of embodiment the maximum temperature attainable is determined by the threshold value beyond which the lacquer insulating the various turns from one another looses its insulating properties.

To increase the maximum permissible temperature without any risk of destroying the insulating layer surrounding the conductors of coil 18 and increase the heating power, in a specific form of embodiment these conductors may be hollow and connected to a cooling circuit for the sole purpose of cooling the coil.

According to a modified form of embodiment the aforesaid hollow conductors, as shown in FIG. 5, comprise perforations 11 opening radially towards the mold 13. Thus, when the heating is discontinued, i.e., when the induction coil 18 is no more energized, the mold 13 and its contents may be cooled by using jets of air or any other suitable cooling fluid emerging under pressure from said nozzle-forming perforations 11. Of course, the coil end is connected at that time to a suitable source of air or fluid through rotary joints.

The efficiency of this machine, although considerably higher than that of hitherto known machines of this character, may be further improved by covering the inner wall of mold 13 wholly or partly with a metal having a higher thermal conductibility than the material constituting the mold proper. Similarly, a lining for preventing heat losses by convection, such as an anodized aluminum film, may be applied to the whole or part of the external mold surface.

These coatings may be utilized notably for improving the local heating of one portion of the mold which, otherwise, would not be heated to the same temperature as the other mold portions.

The efficiency of the machine may be further improved by surrounding the coil 18 with a magnetic circuit secured to the frame structure 2 and adapted to channel the lines of flux generated by said coil.

Moreover, in order to improve the homogeneity of the temperature on the mold surface, plates of a material having a greater thermal conductibility than the material constituting the mold 13, notably copper, may be disposed along the mold portions likely to absorb the greater part of the heat energy. In the case illustrated in FIG. 3 these plates 21 acting like shunts and shown in dash and dot lines are disposed against the two end faces of the mold.

According to a preferred form of embodiment of this invention, the frame structure 2 consists of detachable elements so that it is a simple matter to modify its dimensions in order to accommodate those of the mold to be mounted therein. For the same purpose the struts or legs 5 and 7 are adjustable so that the height of axis X-X' in relation to the bed, floor or other supporting surface can be adjusted at will. Finally, the lower ends of the struts or legs 5 are provided with casters 20 adapted to roll on a track 22 so that the length of the frame structure 2 can be modified as necessary.

Of course, the coil 18 is connected to the frame structure 2 via insulating brackets 23 and the coil energization, like that of motor 16, is obtained through electric conductors leading to slip rings 24, these conductors extending of course through the hollow trunnion 3b.

The frame structure 2 is provided, on the side opposed to that supporting the electric motor 16, with a balance weight 25.

With this arrangement, the machine according to this invention is easy to operate and affords a high degree of efficiency and a high production rate, even if the articles to be molded are to be produced in small series or quantities, or have very different dimensions.

This machine may be used notably for the rotary molding of synthetic materials, but also for mixing a plurality of liquid, solid or pulverulent components in a heated vessel, for performing certain heat treatments or certain chemical processes by heating.

What is claimed is :

1. Rotary molding machine, of the type comprising a frame structure adapted to be rotatably driven about a first transverse axis and provided with means capable of rotatably driving a mold or a detachable vessel containing the material to be molded about a second axis perpendicular to said first axis, wherein said mold or vessel consists of a material of relatively moderate thickness, adapted to be heated by induction, the heating means implemented therefor consisting of an induction coil connected to a source of low-frequency alternating current, said coil being secured to said frame structure and consisting of conductors wound with contiguous turns about an axis orthogonal to said first and second axes of rotation of said mold, so as to constitute a kind of sheath having a shape homothetic to that of said mold and bounded by two planes parallel to the plane containing said axes of rotation of said mold said mold carrying a pair of aligned, opposed coaxial trunnions adapted the one to be coupled to driving means adapted to rotate said mold and the other to engage bearing all the induction coil energizing conductors being disposed on the said side of said trunnions, the conductors of said induction coil being hollow and connected to a cooling circuit; perforations being formed in said hollow conductors and open radially towards said mold to act as nozzles for distributing jets of cooling fluid against said mold; whereby the mold, having its outer surface very close to, but not in contact with, the inner surface of said coil, can easily be fitted into or removed from said coil and nevertheless heated very rapidly and throughout its wall to a homogeneous temperature causing the material contained therein to melt or be held at a predetermined temperature.

2. Molding machine as set forth in claim 1, wherein said mold consists of mild steel and its wall thickness ranges from 10 to 3 mm and is preferably of the order of 5 mm.

3. Molding machine as set forth in claim 2, wherein the inner surface of said mold is coated wholly or partly with a metal having a greater thermal conductibility than the material constituting the mold proper.

4. Molding machine as set forth in claim 3, wherein the outer surface of said mold is lined wholly or partly with a coating preventing the losses of heat by convection.

5. Machine as set forth in claim 4, wherein plates of a material having a greater thermal conductibility than the mold material are disposed along portions of the outer surface of the mold which are likely to absorb more heating power than the other portions.

6. Rotary molding machine, of the type comprising a frame structure adapted to be rotatably driven about a first transverse axis and provided with means capable of rotatably driving a mold containing the material to be molded about a second axis perpendicular to said first axis, the mold carrying a pair of aligned, opposed coaxial trunnions one adapted to be coupled to driving means adapted to rotate said mold and the other to engage a bearing, and the mold being heatable by heating means consisting of an induction coil connected to a source of low-frequency alternating current, said coil being secured to said frame structure and consisting of conductors wound with contiguous turns about an axis orthogonal to said first and second axes of rotation of said mold, so as to constitute a kind of sheath having a shape homothetic to that of said mold and bounded by two planes parallel to the plane containing said axes of rotation of said mold, all the induction coil energizing conductors being disposed on the same side of the trunnions, whereby the mold, having its outer surface very close to, but not in contact with, the inner surface of said coil, can easily be fitted into or removed from said coil and nevertheless heated very rapidly and throughout its wall to a homogeneous temperature causing the material contained therein to melt or be held at a predetermined temperature.

* * * * *